United States Patent [19]

Ambroise et al.

[11] Patent Number: 4,689,084

[45] Date of Patent: Aug. 25, 1987

[54] COMPOSITE MATERIAL FOR CONSTRUCTION PURPOSES BASED ON POZZUOLANAS AND GLASS FIBERS AND PROCESSES FOR MANUFACTURING SAME

[75] Inventors: Jean Ambroise, Bron; Michel Murat, Caluire; Jean Pera, Villeurbanne, all of France

[73] Assignee: Institut National des Sciences Appliquees de Lyon, France

[21] Appl. No.: 817,122

[22] Filed: Jan. 8, 1986

[30] Foreign Application Priority Data

Jan. 10, 1985 [FR] France ................. 85 00474

[51] Int. Cl.$^4$ ................................. C04B 7/02
[52] U.S. Cl. ........................... 106/99; 106/98
[58] Field of Search .................... 106/99, 98

[56] References Cited

U.S. PATENT DOCUMENTS

| | | | |
|---|---|---|---|
| 3,147,127 | 9/1964 | Shannon | 106/99 |
| 3,834,916 | 9/1974 | Kesler | 106/99 O |
| 3,852,082 | 12/1974 | Majumdar | 106/99 O |
| 4,090,884 | 5/1978 | Goeman | 106/99 O |
| 4,115,135 | 9/1978 | Goeman | 106/99 O |

FOREIGN PATENT DOCUMENTS

| | | |
|---|---|---|
| 8100252 | 2/1981 | PCT Int'l Appl. . |
| 1113205 | 5/1968 | United Kingdom . |
| 1588938 | 4/1981 | United Kingdom . |

OTHER PUBLICATIONS

Chemical Abstracts, vol. 89, 1978, p. 473.

*Primary Examiner*—William R. Dixon, Jr.
*Assistant Examiner*—Karl Group
*Attorney, Agent, or Firm*—Parkhurst & Oliff

[57] ABSTRACT

This invention relates to a composite material for construction purposes, constituted by a mixture based on cement, pozzuolanas and glass fibers, wherein the mixture comprises:

on the one hand, hydrated pozzuolanas obtained from kaolinic compounds, and on the other hand, non-metallic, inorganic glass fibers sensitive to alkalis.

The invention also relates to processes for making this product adapted for the manufacture of bearing or insulating panels for buildings.

7 Claims, No Drawings

COMPOSITE MATERIAL FOR CONSTRUCTION PURPOSES BASED ON POZZUOLANAS AND GLASS FIBERS AND PROCESSES FOR MANUFACTURING SAME

The present invention relates to a novel composite material for construction purposes, based on pozzuolanas and glass fibers; it also relates to processes for manufacturing this material.

It has been proposed for a long time to reinforce cements by means of glass fibers, particularly for manufacturing panels for construction. However, if glass fibers are mixed with conventional cements such as for example Portland cement (CPA), the lime released during hydration attacks these glass fibers and rapidly provokes corrosion thereof. In order to overcome these drawbacks, it has been suggested to replace the conventional glass fibers, particularly for textile use designated as "fibers E", by glass fibers which resist alkalis, such as those containing an appreciable proportion of zirconium. These fibers, which resist the lime well, give good results when they are mixed with the cement, but present the drawback on the industrial scale of being very expensive compared with conventional glass fibers, with the result that this technique has not been widely developed.

DE-A-3 315 357 and FR-A-2 149 988 (corresponding to US-A-3 852 082) suggest adding to these mixtures of alkali- and lime-resisting glass fibers natural or artificial pozzuolanas, i.e.:
either pozzuolanas extracted from the ground,
or pozzuolanas coming from industrial waste, such as fly-ash, blast-furnace slag or silica dust.

As before, in all these processes, it is indispensable to employ glass fibers which resist alkalis, particularly fibers based on zirconium. This renders these processes expensive and leads to composite materials which are too often determined to be irregular, particularly due to the origin of the pozzuolanas used.

It is an object of the invention to overcome these drawbacks.

It firstly envisages a composite material of the type in question, which is easy and economical to make, and presents good mechanical qualities.

This composite material for construction purposes, constituted by a mixture based on cement, pozzuolanas and glass fibers, is characterized in that it is constituted by a mixture:
of hydrated synthetic pozzuolanas, obtained from kaolinic compounds,
of cement,
and of non-metallic inorganic glass fibers, sensitive to alkalis.

In other words, the invention consists firstly in replacing the natural or artificial pozzuolanas by a specific synthetic pozzuolana, namely a pozzuolana obtained from natural inorganic kaolinic compounds, i.e. rich in kaolinite. Such substitution presents the totally unexpected advantage of permitting glass fibers sensitive to alkalis to be used, whilst all the techniques of the prior art required the use of glass fibers resistant to alkalis. It could therefore not be foreseen that this simple change would enable such inexpensive fibers to be used since, as has already been said, the prior art required that fibers insensitive to alkalis, such as fibers based on zirconium, i.e. expensive fibers, should be exclusively employed.

This is therefore a break from tradition and a preconception overcome.

"Synthetic pozzuolanas obtained from kaolinic compounds" designates natural inorganic products based on kaolin, such as clays, laterites, tropical soils, rich in kaolinite, which have been calcined at temperatures of between 650° and 850° C., and preferably between 700° and 800° C., so as to effect a thermic activation. "Products rich in kaolinites" must be understood to mean products which not only present at least 40% and preferably 50% by weight of kaolin, but in which the balance is essentially constituted by silica and iron oxides, to the exclusion of other clay-like minerals.

These synthetic pozzuolanas present binding properties in the presence of a chemical activator such as for example lime and more precisely calcium hydroxide.

It was certainly known that the addition of natural or artificial pozzuolanas to cements made it possible to consume the lime formed during hydration. However, this was a slow phenomenon which might last a year or more. It could therefore not be foreseen that the substitution for these natural or artificial pozzuolanas by a particular synthetic pozzuolana, namely the one issuing from products rich in kaolinite, would enable the lime formed to be consumed much more quickly, namely only in a few days and at the most in a few weeks, and this as a function of the initial composition of the cement+synthetic pozzuolanas mixture. Thus, due to this high reactivity of the specific synthetic pozzuolana used, the lime formed is consumed as it is formed, which limits and even eliminates the chemical attack on the reinforcing fibers, which were thought to be necessarily resistant to alkalis; this renders possible the use of alkali-sensitive, therefore inexpensive, fibers.

Similarly, it has been ascertained that the use of other synthetic pozzuolanas prepared from clays other than kaolinic clays, did not enable such a result to be obtained economically.

The term "non-metallic inorganic glass fibers sensitive to alkalis" designates filiform elements, continuous (filaments) or discontinuous (fibers), which are attacked at ambient temperature by alkalis, particularly by lime in solution, and which are obtained by extrusion of amorphous molten glass, i.e. a non-crystalline solid having no order at long distance. Depending on the composition of the basic glass and the technique of extrusion, the following are obtained:
either "textile glass fibers", by extrusion and by mechanical drawing of a boro-silicate of alumina and of lime virtually bereft of alkali; the most wide-spread of such fibers, intended for textile applications, being called "fiber E", of hardly dispersed diameter of which the average is generally included between 10 and 15 micrometers;
or an "inorganic wool", obtained by drawing, blowing and/or by internal or external centrifugation:
either of a boro-silicate of alumina and of lime, rich in alkali (10 to 20%), which gives a "glass wool",
or a slag or basalt comprising an appreciable proportion of iron, which gives a "rock wool"; such inorganic wools being in the form of an entanglement, of appreciable thickness, of undulating elementary fibers, of which the diameters are dispersed, but of which the average is generally included between three and ten micrometers.

Advantageously, in practice:

the mixture of the invention also comprises hydrated Portland cement (CPA), no longer containing free lime: $Ca(OH)_2$;

the proportion by weight of glass fibers E is less than ten per cent (10%), preferably less than five per cent (5%), and in particular included between 0.5 and 2.5%;

this reinforcing textile glass fiber E may be in very varied forms, such as mats, voiles, non-woven cloths, woven or non-woven fabrics, screens, layers of unidirectional multifilament yarns, rovings, etc . . . ; the proportion of glass fibers, the structure, texture of the textile materials used depend essentially on the applications envisaged;

the glass fiber is an inorganic wool, rock or glass wool, and the proportion by weight of these glass fiber wools varies depending on the final use envisaged.

The invention also relates to processes for manufacturing such a composite material constituted by a hydrated synthetic pozzuolanic binder reinforced by glass fibers sensitive to alkalis.

In a first embodiment, adapted to textile glass fibers E in particular, this process consists:

firstly, in mixing synthetic kaolinic pozzuolanas, water, and a compound generating lime;

then in reinforcing this mixture by glass fibers E;

and finally, in forming this material into a composite material.

In this embodiment, in practice:

the mass ratio between the synthetic pozzuolanas and the lime is greater than one and a half (1.5);

the mass ratio between the synthetic kaolinic pozzuolanas and the CPA is included between 0.25 and 4, and preferably close to one; it has been ascertained that with a pozzulana issuing from pure kaolin, the best results were obtained with a mass ratio close to one;

the ratio by weight between the water and the other solid matters (pozzuolanas and lime or CPA) is included between 0.3 and 0.6.

In practice, lime, particularly fat lime, may be added to the mixture of synthetic pozzuolanas and water.

In a variant, synthetic pozzuolanas and Portland cement are mixed which, under the effect of the addition of water, will form lime, which in turn will hydrate the pozzuolanas to harden them. This reaction releases hydrates such as for example hydrated gehlenite and hydrated calcium silicate, then the lime disappears as the reaction continues or as it is formed.

In a second embodiment, adapted to inorganic wools, this process consists:

firstly, in mixing inorganic wools, synthetic kaolinic pozzuolana powders and a compound generating lime, dry, then in wetting this mixture with water, and finally, in forming this mixture into a composite material.

In a third embodiment, likewise adapted to inorganic wools, this process consists:

firstly in shaping this inorganic wool with a generally organic binder;

then in impregnating this product with an aqueous suspension of synthetic kaolinic pozzuolana powders and a compound generating lime, and finally, in eliminating the excess water, for example by mechanical or heat means.

The reaction advantageously takes place at ambient temperature.

It has been surprisingly observed that the lack of lime in the mixture with the synthetic kaolinic pozzuolanas improves the mechanical strength of the finished composite material.

With the inorganic wools, pozzuolanas are advantageously used which are prepared from clays particularly rich in kaolinite, i.e. having an initial kaolin content higher than 90%. These pozzuolanas, essentially constituted by metakaolinite, present the advantage of being in a state of optimum crystalline disorganization, therefore presenting a higher optimum reactivity.

On the other hand, with glass fibers E, pozzuolanas may be used which are prepared from laterites or tropical soils, i.e. compounds of which the kaolin content is lower, but nonetheless substantial.

It has certainly been known for a long time to mix natural or artificial pozzuolanas and lime. However, as is known, the speed of hydration of this mixture is very slow. Consequently, lime remains in the mixture for very long periods (a year and more). A reinforcement of lime and natural or artificial pozzuolanas by glass fibers therefore necessitates the use of zirconium fibers insensitive to alkalis, otherwise the residual lime would corrode the glass fibers, with the result that the mechanical performances of the material remain insufficient. Nothing would enable it to be deduced that the combination of this same lime with synthetic kaolinic pozzuolanas would make it possible to add to this mixture glass fibers sensitive to alkalis, whilst it was precisely known that, during addition of glass fibers in cement, the lime of the latter corroded these glass fibers. The process according to the invention thus constitutes an intellectual break from conventional teachings and in particular makes it possible to pass from failure to success whilst reducing the cost.

The invention will be more readily understood by reading the following Examples given by way of example and should not be viewed as limiting the scope of the invention.

EXAMPLE 1

In a known manner, a synthetic kaolinic pozzuolana is prepared by calcination of kaolinite at 750° C. for five hours.

Three parts of this metakaolin are mixed with one part by weight of fat lime without hydraulic character. To ten parts of this mixture are then added six parts of water.

With this mixture, parallelepipedic plates measuring 50×25×1.3 centimeters are made, which are then subjected to a centered flexion (distance between supports: 45 cm).

EXAMPLE 2

Example 1 is repeated, adding to the mixture 37.4 grams of unidirectional, continuous, multifilament textile glass fibers E disposed lengthwise (a mass ratio close to one per cent).

The stress at break in traction by flexion of this plate, calculated in accordance with the hypotheses of the linear elasticity, is 18.8 MPa. On the other hand, by way of comparison, the pure tensile stress of the same plate without glass fibers. (Example 1) is only 2.4 MPa.

EXAMPLE 3

Examples 1 and 2 are repeated with Portland cement of class CPA 55.

The cement not laden with glass fibers presents a tensile strength of 6.9 MPa, whilst the composite material, i.e. laden with glass fibers, presents a tensile strength by flexion of 15.2 MPa.

EXAMPLE 4

Examples 1 and 2 are repeated with a mixture containing one part of Portland cement CPA 55 and one part of metakaolin. The binder without fibers presents a tensile strength of 3.7 MPA, whilst the composite material with fibers presents a tensile strength by flexion of 16.8 MPa.

EXAMPLE 5

Examples 1 and 2 are repeated, replacing the metakaolin by a calcined laterite and by modifying the proportion of laterite with respect to that of the part by weight of lime. The tensile strength of this binder is 1.8 MPa and the tensile strength by flexion of the plate reinforced with glass fibers is 20 MPa.

These Examples illustrate the progress made by the invention, particularly the fact that the metakaolin (Example 3) consumes the residual lime of the Portland cement (CPA), since the bends observed before break between Examples 3 and 4 are doubled.

EXAMPLE 6

By suction under a pressure 0.7 bar, a layer of glass wool is thoroughly impregnated with a laitance formed by an aqueous suspension of synthetic kaolinic pozzuolana according to Example 1 and a mixture of fat lime, of which the viscosity is less than 0.5 $Pa.s^{-1}$. The product obtained comprises by weight as many glass fibers as cement.

This mixture is then compressed slightly to give it a shape and reduce its thickness.

It is left to react for a few days in order to ensure setting of the cement in a damp medium and the excess water is eliminated.

Plates are thus obtained of which the tensile strength by flexion is 6 MPa, the tensile strength of the binder without fiber being only 2.3 MPa.

EXAMPLE 7

A layer of insulating glass wool in bulk having a weight of one kilo per square meter and a density close to fifteen kilos per cubic meter and fibers with an average diameter of six microns, is opened pneumatically a known manner.

Rovings are thus made, about one meter long, with the result that the apparent density of the tufts is close to five kilos per cubic meter.

A homogeneous pulverulent mixture is introduced into these tufts by pneumatic means, said mixture constituted:
half by CPA 55
half by metakaolin.

The pulverulent mixture represents in proportion 90% by weight of the glass wool+binder mixture.

The glass wool impregnated with powder is then subjected to atomization by a water jet at ambient temperature.

The product obtained is then compressed. It presents a tensile strength to binding of 10 MPa, whilst the pure tensile strength of the binder without fiber is only 3.7 MPa.

This material is perfectly suitable for making vertical wall coverings, for use in particular as insulating material (fire door, outside insulation).

The invention presents numerous advantages over heretofore known techniques. For example:

the possibility of making mineral matrices at low cost, and this under excellent economical conditions and with low energy consumption;

the possibility of reinforcing cements or the like by inexpensive glass fibers, said glass fibers not being corroded in time by the cement, which was not known up to the present;

the possibility of making resistant inorganic structures such as facade panels, roofing panels, even tiles;

the possibility of carrying out this process in situ, without the use of special equipment and without necesitating natural pozzuolanas, and whilst employing abundant raw materials.

The composite materials made in this manner may be used in various forms, and in particular in the form of bearing panels (floorboards) or insulating panels (vertical panels) for the construction of buildings, and even in public works, for example for manufacturing reinforced cement pipes, advantageously replacing the heretofore used cement/asbestos fiber mixtures.

What is claimed is:

1. A composite glass-fiber reinforced construction material, comprising:
   a cement compound which generates lime;
   less than 10% by weight of non-metallic inorganic non-alkali resistant glass fibers; and
   synthetic pozzuolanas obtained by calcination from kaolinic compounds, said kaolinic compounds containing at least 40% by weight of Kaolin, selected from the group consisting of clays, laterities and tropical soils.

2. The composite material of claim 1, wherein the cement compound is artificial Portland cement and a mass ratio between the synthetic kaolinic pozzuolanas and the Portland cement is approximately one.

3. The composite material of claim 1, wherein the non-alkali resistant glass fibers are E glass-fibers and a percent by weight of said E glass-fibers is between 0.5 and 2.5%.

4. The composite material of claim 1, wherein the non-alkali resistant glass-fibers comprise inorganic wools selected from the group consisting of rock wools and glass wools.

5. A process for manufacturing a composite glass-fiber reinforced construction matrix material comprising:
   calcining at a temperature of between 650 and 850° C. kaolinic compounds containing at least 40% by weight of Kaolin, to obtain synthetic metakaolinic pozzuolanas;
   mixing said metakaolinic pozzuolanas with water and an inorganic compound generating lime to form a mixture, a mass ratio between the metakaolinic pozzuolanas and the limegenerating compound being between 0.25 and 4 and a weight ratio between the water and all solids being between 0.3 and 0.6;
   reinforcing said mixture with E glass-fibers; and
   forming said mixture into a composite matrix material.

6. A process for manufacturing a composite glass-fiber reinforced matrix construction material comprising:

dry mixing inorganic wools, powdered synthetic metakaolinic pozzuolanas and a compound which generates lime to form a mixture, said metakaolinic compound being obtained from calcining kaolinic compounds containing at least 40% by weight of Kaolin, said kaolinic compounds being selected from the group consisting of clays, laterities and tropical soils;

wetting said mixture with water; and forming said mixture with a composite mixture material.

7. A process for manufacturing a composite glassfiber reinforced construction material comprising:

shaping an inorganic wool comprising an inorganic binder;

impregnating said bound wool with an aqueous suspension comprising synthetic metakaolinic powdered pozzuolanas and an inorganic compound generating lime; and eliminating excess water.

* * * * *